United States Patent [19]
Trubiano

[11] 3,834,724
[45] Sept. 10, 1974

[54] NESTABLE CAR ORDER CART

[76] Inventor: Antoine Trubiano, 36 Marien St., Montreal East 550, Quebec, Canada

[22] Filed: Feb. 9, 1973

[21] Appl. No.: 331,272

[52] U.S. Cl............................ 280/33.99 H, 280/79.3
[51] Int. Cl........................... B62b 3/02, B62b 11/00
[58] Field of Search............280/33.99 R, 33.99 H, 280/33.99 F, 33.99 S, 33.99 T, 35, 36 R, 36 B, 41 A, 79.1, 79.2, 79.3

[56] References Cited
UNITED STATES PATENTS

| | | | |
|---|---|---|---|
| 2,419,790 | 4/1947 | Peltier | 280/41 A |
| 2,738,201 | 3/1956 | Spears | 280/33.99 H |
| 2,962,292 | 11/1960 | Edmonston | 280/33.99 H |
| 3,039,783 | 6/1962 | Stanley | 280/33.99 H |
| 3,052,319 | 9/1962 | Swanson | 280/33.99 F |
| 3,464,715 | 9/1969 | Anderson | 280/36 R |

Primary Examiner—David Schonberg
Assistant Examiner—David M. Mitchell
Attorney, Agent, or Firm—Alan Swabey; Robert E. Mitchell

[57] ABSTRACT

A nestable car order cart having an upright frame opening out toward the front. One, and preferably two, shelves are hingedly mounted at the back of the frame. The shelves can move between a raised position, permitting carts to be nested, and a horizontal position to carry goods. Means are provided on the bottom rear of the cart for camming the lower shelf of a second cart, into which the first cart is being nested, upwardly to the raised position.

4 Claims, 4 Drawing Figures

PATENTED SEP 10 1974 3,834,724

NESTABLE CAR ORDER CART

BACKGROUND OF THE INVENTION

1. Field of the Invention

This invention relates to a nestable car order cart.

2. Description of Prior Art

Car order carts are now used in supermarkets in order to transport groceries from the check-out counter to the customer's car. The carts are of the upright type having a bottom and upper shelf on which the groceries are loaded. The carts, when not being used, take up a lot of the floor space in the store.

SUMMARY OF THE INVENTION

It is a purpose of the present invention to provide a car order cart constructed in such a manner that the carts, when not being used, can be stored in nested relationship to one another, thus reducing the amount of floor space required by the carts when not being used.

The invention is more particularly directed toward a nestable car order cart, which includes a frame having a bottom U-shaped portion opening to the front of the cart and shaped to nestably receive the bottom U-shaped portion of the frame of a second cart. The cart includes at least one shelf pivotably mounted at or adjacent the base of the bottom, U-shaped portion of the frame and normally extending toward the front of the cart. Means are provided at the back of the cart for guiding the shelf on the second cart to an upwardly extending position when the first cart is nested in the second cart.

The cart preferably is constructed to have a second shelf located above the first shelf. The second shelf is pivotably mounted on a vertical portion of the frame for movement between a horizontal position and an upwardly extending position, when two carts are inter-nested.

BRIEF DESCRIPTION OF DRAWINGS

The invention will now be described in detail having reference to the accompanying drawings, wherein.

DESCRIPTION OF PREFERRED EMBODIMENTS

Figure 1:
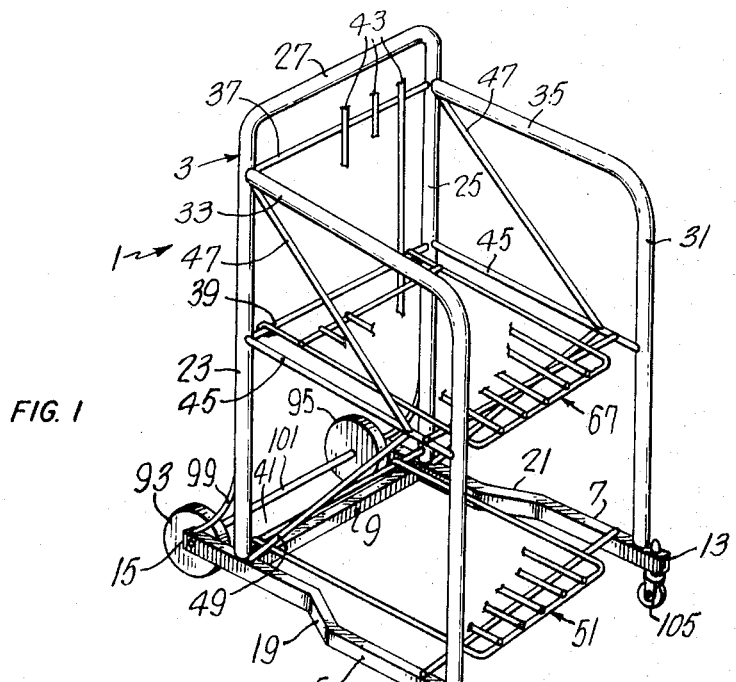
FIG. 1 is a schematic view illustrating a portion of the structure of the nestable car order cart.
Figure 2:
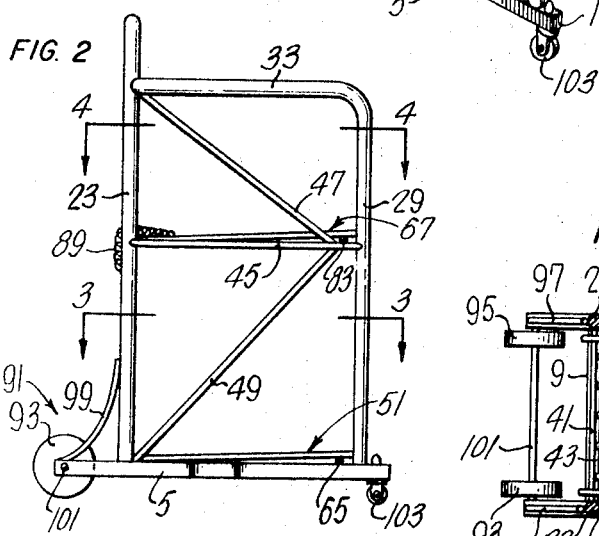
FIG. 2 is a side elevation view of the cart.
Figure 3:
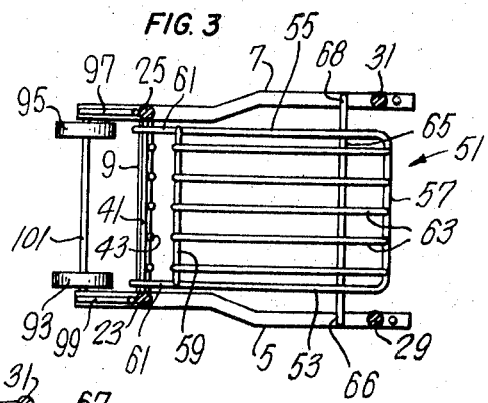
FIG. 3 is a cross-sectional view taken along line III—III of FIG. 2, showing in detail the construction and mounting of the bottom shelf.
Figure 4:
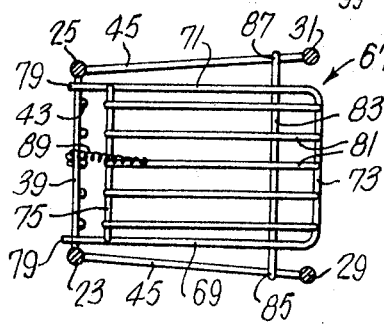
FIG. 4 is a cross-sectional view taken along line IV—IV of FIG. 2, showing in detail the construction of the top shelf.

The car order cart 1 includes a frame 3 which is preferably made of tubular members. The frame 3 includes bottom side members 5 and 7. The bottom side members are joined at or adjacent one end by a cross member 9. The bottom side members 5, 7 and the cross member 9 form a substantially U-shaped portion, which opens toward the front of the cart. This bottom U-shaped portion is constructed to have the front ends 11 and 13 of the bottom side members 5 and 7 spaced farther apart than the back ends 15, 17 of the bottom side members. This can be done by having the bottom side members diverge away from each other from their point of connection by the cross member 9 or, as shown in FIG. 1, by forming an outward jog 19 and 21 in each member 5 and 7. The jog is located close to the cross member 9.

The frame also includes vertical back members 23 and 25. Member 23 is attached to and extends upwardly from side member 5 adjacent the connection to the cross member 9 and member 25 is attached to and extends upwardly from the side member 7 adjacent its connection to the cross member 9. The tops of the vertical side members are joined by a top cross member 27. The vertical back members 23, 25 and the top member 27 can be formed in one piece by suitably bending a tubular member. The top cross member 27 forms a handle for maneuvering the cart.

The frame further includes vertically extending front members 29 and 31 with front member 29 extending vertically upward from the front end 11 of bottom side member 5 and fixed thereto, and the member 31 extending up from the front end 13 of the bottom side member 7 and fixed thereto. The top of each of the vertical front members 29 and 31 are joined by top side members 33 and 35 respectively to the vertical back members 23, 25 at a position slightly below the top of the cross member 27. The vertical front member 29 and the top side member 33 can be made in one piece from a tubular member which has been suitably formed, as can the vertical front member 31 and its top side member 35.

Extending horizontally between the vertically extending back members 23 and 25 are top, intermediate, and bottom bars 37, 39 and 41, respectively. These bars are rigidly connected to the vertical back members 23, 25 and provide support for a plurality of vertically extending rods 43, which are fixed to the bars by welding or other suitable means.

The frame is also provided with horizontal side bars 45, level with intermediate bar 39, and extending between the back members 23 and 25 and the respective front members 29 and 31. Additional reinforcing for the frame can be provided by diagonal stiffener bars 47 and 49, each connected at one end to the horizontal bar 45, at or near the vertical front members 29, 31 and extending diagonally toward and connected to the vertical back members 23, 25.

Mounted on the frame is a bottom shelf 51. The bottom shelf includes side bars 53, 55 and front and back bars 57 and 59. The side bars project back past the back bar 59 and are formed into hooks 61 to pivotally fix the shelf to the bottom horizontal bar 41. This permits the shelf to pivot about the bar 41. Support rods 63 extend between the front and back bars 57, 59. Located adjacent the front bar 57, and attached to the side bars 53, 55, is a parallel support bar 65, the ends of which project past the side bars 53, 55. The ends 66, 68 of the support bar project a sufficient distance so as to rest on top of the bottom side members 5 and 7 and thus maintain the pivotally mounted shelf in a horizontal position. When in this position, groceries can be loaded onto the shelf.

The cart is also provided with a top shelf 67 similar to the bottom shelf 51. The top shelf 67 includes side bars 69, 71 and front and back bars 73, 75. The side bars 69 and 71 project past the back bar 75 and are formed into hooks 79 at their ends to fasten the shelf onto intermediate horizontal bar 39. A plurality of support rods 81 extend between the front and back bars 73, 75. The top shelf also includes a support bar 83, attached to side bars 69, 71 and located parallel to and adjacent the front bar 73. The ends 85, 87 of support bar 83 extend outwardly past the side bars 69, 71. These ends 85, 87 of the support bar project a distance sufficient to rest on the horizontal side bars 45 so as to maintain the shelf in a substantially horizontal position to receive additional groceries. A spring 89 is attached to one of the support rods 81 forming a part of the upper shelf and extends over the intermediate bar 39 and downwardly therefrom to be attached to one of the vertical rods 43. This spring normally maintains the upper shelf 67 in a raised position. When it is desired to use the cart, the upper shelf is moved down to a substantially horizontal position to rest on the horizontal side bars 45 and groceries are then placed on the shelf.

The cart includes guide means 91 at the back of the frame for guiding the lower shelf of the second cart to a raised position when the first cart is nested between the bottom side members and the vertical front members of the second cart. The guide means 91 can comprise a pair of guide rods 97, 99. The guide rods are concavely curved and extend up from one end of side members 5 and 7 to be attached to the respective back members 23, 25 partway up their length. The guide rods can be formed to extend down and about the lower rear ends 15 and 17 of the side members 5 and 7. In this position, the lower portion of the guide rods 97, 99 are located at a level which is below the leading edge 57 of the bottom shelf when in its normal, substantially horizontal, position. Thus, when the cart is moved into nesting relationship with a second cart between its side members, the leading edge 57 of the lower shelf of the second cart will be cammed up by the guide rods 97, 99 to raise the shelf about its pivot defined by rod 41, thus permitting the carts to be nested. The second shelf 67, being maintained in a vertical extending position by the spring 89, is normally out of the way when the carts are being internested. In the nested position, the carts take up much less space than they would if they were not nested.

The cart preferably is provided with a pair of rear wheels 93, 95, which are connected to the side members 5, 7 at their rear ends 15, 17 by an axle 101. The wheels preferably form part of the guide means. The wheels are located to extend rearwardly past the guide rod 97, 99 and are sized to have a diameter less than twice but substantially greater than the height of the leading edge 57 of the lower shelf from the floor when the shelf is supported in a substantially horizontal position. Thus, when one cart is backed into nesting relationship with a second cart, the leading edge 57 of the lower shelf rides up on the upper portion of the peripheries of the wheels to be moved vertically upwardly about its pivot rod 41. From the wheels, the shelf 57 passes onto the guide rods 97, 99 to continue its upward movement to permit the carts to be internested.

The front portion of the cart can be supported by a pair of small wheels 103, 105 connected to the front ends 11, 13 of the side members 5, 7 respectively.

I claim:

1. A nestable car order cart having a frame supported by wheels which includes two bottom side members and means joining the bottom side members together at or near their back ends, the front free ends of the bottom side members spaced wider apart from one another than the spacing between the back ends of the bottom side members where they are joined, a bottom shelf having a free end remote from the back of the frame, means pivotally mounting the bottom shelf along one end at or near the back ends of the bottom side members, means for normally supporting the bottom shelf in a substantially horizontal position on the bottom side members, means at the back of the frame for upwardly guiding a bottom shelf on a second cart when the second cart nestingly receives the first cart, and wherein the frame includes vertical members extending upwardly from the back end of the bottom side members, and front members extending vertically upward from each of said front ends of said bottom side members to meet with said vertical members an upper shelf, having a free end remote from the back of the frame and being pivotally attached at one end to the vertical members, means carried between the vertical and front members on each side of the cart for supporting the upper shelf in a substantially horizontal position.

2. A shopping cart as claimed in claim 1, including spring means connected between the upper shelf and the vertical members to bias the upper shelf to a vertically extending position.

3. A nestable shopping cart as claimed in claim 1, wherein the guiding means at the back of the frame include a pair of concavely curved rods extending up and away from the back ends of the bottom side members.

4. A nestable shopping cart as claimed in claim 3, wherein the guiding means includes a pair of wheels attached to the rear end of the frame, said wheels supporting the cart, and dimensioned to have a diameter less than twice, but substantially greater than the distance the free end of the bottom shelf, opposite the end by which it is mounted, is from a floor on which the cart runs, whereby the bottom shelf of the second cart will be cammed upwardly by contact of its free end with the upper portion of the peripheries of the wheels on the first cart when the carts are nested.

* * * * *